(12) United States Patent
Hagano

(10) Patent No.: US 10,399,436 B2
(45) Date of Patent: Sep. 3, 2019

(54) OPENING/CLOSING APPARATUS FOR FUEL TANK

(71) Applicant: TOYODA GOSEI CO., LTD., Kiyosu-shi, Aichi-ken (JP)

(72) Inventor: Hiroyuki Hagano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 96 days.

(21) Appl. No.: 15/835,522

(22) Filed: Dec. 8, 2017

(65) Prior Publication Data

US 2018/0178644 A1   Jun. 28, 2018

(30) Foreign Application Priority Data

Dec. 27, 2016 (JP) ................. 2016-252155

(51) Int. Cl.
*B60K 15/04* (2006.01)
*F02M 37/00* (2006.01)
*F16K 31/00* (2006.01)
*B67D 7/04* (2010.01)
*F16K 17/36* (2006.01)

(52) U.S. Cl.
CPC ............ *B60K 15/0406* (2013.01); *B67D 7/04* (2013.01); *F02M 37/0076* (2013.01); *F16K 17/366* (2013.01); *F16K 31/003* (2013.01); *B60K 2015/047* (2013.01); *B60K 2015/0448* (2013.01); *B60K 2015/0461* (2013.01); *B60K 2015/0464* (2013.01)

(58) Field of Classification Search
CPC .... B60K 2015/0461; B60K 2015/0538; B60K 2015/03595; B60K 15/03519; B67D 7/04; F16K 17/366; F02M 37/0076

USPC .......................................... 141/350; 220/86.2
See application file for complete search history.

(56) References Cited

U.S. PATENT DOCUMENTS

| 4,630,749 | A | * | 12/1986 | Armstrong | ............... | B67D 7/54 |
| | | | | | | 141/59 |
| 4,714,172 | A | * | 12/1987 | Morris | ............. | B60K 15/03519 |
| | | | | | | 137/351 |
| 4,724,861 | A | * | 2/1988 | Covert | ................... | B60K 15/04 |
| | | | | | | 137/202 |
| 4,747,508 | A | * | 5/1988 | Sherwood | ........ | B60K 15/03519 |
| | | | | | | 141/326 |

(Continued)

FOREIGN PATENT DOCUMENTS

JP   2014-069618 A   4/2014

*Primary Examiner* — Timothy L Maust
(74) *Attorney, Agent, or Firm* — Posz Law Group, PLC

(57) ABSTRACT

An opening/closing apparatus for a fuel tank of a vehicle includes: a fuel passage forming portion; an insertion-side opening/closing valve mechanism; a fuel tank-side opening/closing valve mechanism; a liquid discharge path; and an opening/closing valve mechanism that opens and closes the liquid discharge port by a valve body disposed in the fuel passage forming portion, and that includes a moving body movable from a first position where a closing force exerts on the valve body to close the liquid discharge port to a second position where the closing force decreases, the moving body positioned at the first position in a state where the vehicle is stopped, and moving from the first position to the second position when receiving an inertial force due to traveling of the vehicle.

6 Claims, 12 Drawing Sheets

(56) References Cited

U.S. PATENT DOCUMENTS

| | | | | |
|---|---|---|---|---|
| 4,765,504 | A | * | 8/1988 | Sherwood ........ B60K 15/03519 |
| | | | | 141/59 |
| 4,941,587 | A | * | 7/1990 | Terada ................... B60K 15/04 |
| | | | | 220/746 |
| 5,375,633 | A | * | 12/1994 | Bucci ..................... B60K 15/04 |
| | | | | 137/587 |
| 6,029,719 | A | * | 2/2000 | Hor ...................... B60K 15/035 |
| | | | | 137/588 |
| 2014/0091095 | A1 | | 4/2014 | Hagano et al. |
| 2017/0362074 | A1 | * | 12/2017 | Wakao ................... B60K 15/00 |

* cited by examiner

OPENING/CLOSING APPARATUS FOR FUEL TANK

CROSS-REFERENCE TO RELATED APPLICATION(S)

This application is based upon and claims the benefit of priority from prior Japanese patent application No. 2016-252155, filed on Dec. 27, 2016, the entire contents of which are incorporated herein by reference.

BACKGROUND

The present invention relates to an opening/closing apparatus for a fuel tank.

In the related art, there is an opening/closing apparatus for a fuel tank, which is opened when a liquid fuel is supplied from a fueling nozzle into a fuel tank of a vehicle, and which is closed when no liquid fuel is supplied. In such an opening/closing apparatus, it is required that the fuel overflowing from a fuel passage where the supplied liquid fuel passes is discharged to the outside, and that infiltration of dust from the outside is prevented. Therefore, there has been proposed a technique in which a liquid discharge path connecting the fuel passage and the outside has a labyrinthine structure (for example, see JP-A-2014-69618)

In the opening/closing apparatus for the fuel tank disclosed in JP-A-2014-69618, although being formed as the labyrinthine structure, the liquid discharge path constantly connects the fuel passage and the outside. Accordingly, in the opening/closing apparatus for the fuel tank, the pressure inside the fuel passage is changed into a negative pressure with the passing of the liquid fuel in the fuel passage when the fuel is supplied, it is concerned that dust and the like is introduced into the opening/closing apparatus together with outside air from the outside.

SUMMARY

It is therefore an object of the invention to provide an opening/closing apparatus for a fuel tank of a vehicle which can solve at least some of the problems described above.

In order to achieve the object, according to an aspect of the invention, there is provided an opening/closing apparatus for a fuel tank of a vehicle, the opening/closing apparatus comprising: a fuel passage forming portion that forms a fuel passage configured to guide a supplied liquid fuel to the fuel tank; an insertion-side opening/closing valve mechanism that is disposed in the fuel passage forming portion, and that is configured to open and close a filler port of the fuel passage; a fuel to opening/closing valve mechanism that is disposed in a portion of the fuel passage forming portion, the portion closer to the fuel tank than the insertion-side opening/closing valve mechanism, the fuel tank-side opening/closing valve mechanism that is configured to open and close the fuel passage; a liquid discharge path that is configured to allow an internal region of the fuel passage forming portion to communicate with the outside of the opening/closing apparatus through a liquid discharge port formed in the fuel passage forming portion between the insertion-side opening/closing valve mechanism and the fuel tank-side opening/closing valve mechanism; and an opening/closing valve mechanism that is configured to open and close the liquid discharge port by a valve body disposed in the fuel passage forming portion, and that includes a moving body which is movable from a first position where a closing force exerts on the valve body to close the liquid discharge port to a second position where the closing force decreases, the moving body which is positioned at the first position in a state where the vehicle is stopped, and which is configured to move from the first position to the second position when receiving an inertial force due to traveling of the vehicle.

DETAILED DESCRIPTION OF EXEMPLARY EMBODIMENTS

Figure 1:
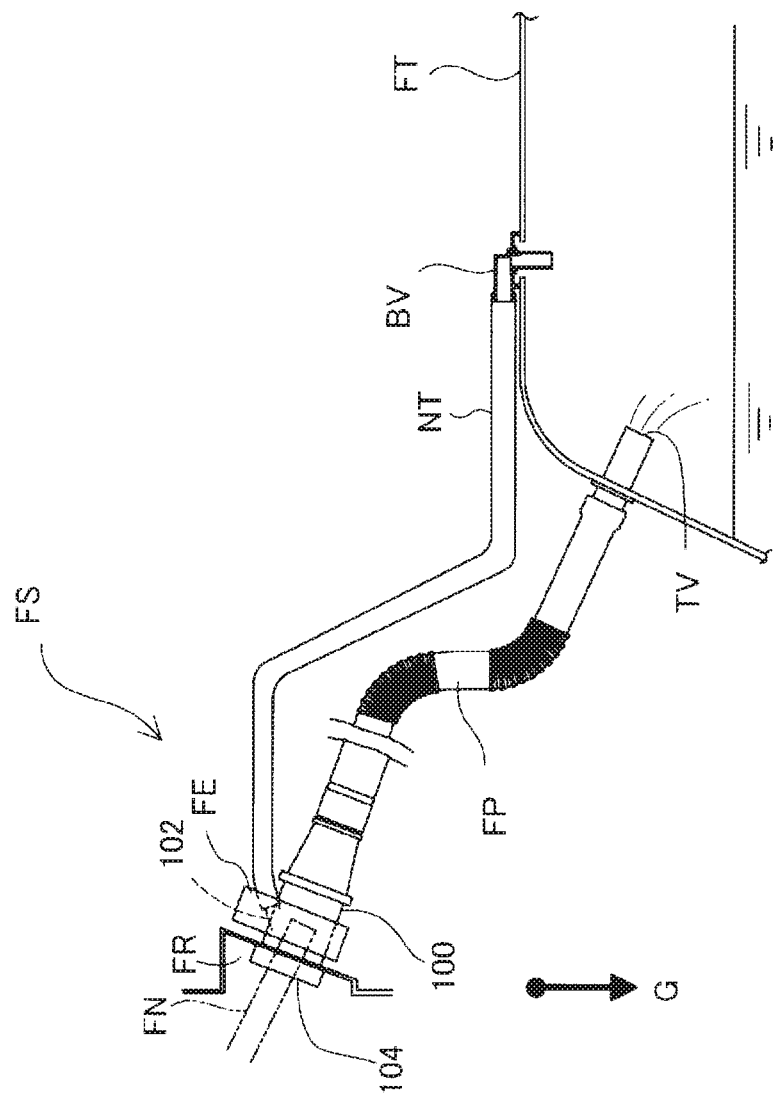
FIG. 1 is an explanatory view illustrating an outline of a fueling apparatus including an opening/closing apparatus for a fuel tank according to embodiments.

A. First Embodiment (1) General Configuration of Opening/Closing Apparatus for Fuel Tank FIG. 1 is an explanatory view illustrating an outline of a fueling apparatus FS including an opening/closing apparatus for a fuel tank according to an embodiment. The fueling apparatus FS guides a fuel supplied from the fueling nozzle FN to a fuel tank FT of a vehicle. In each of the drawings subsequent to FIG. 1, an arrow G is illustrated to indicate a vertical direction. The fueling apparatus FS includes a filler neck 100, a fuel vapor port 102, a filler pipe FP, a check valve TV, a fuel vapor tube NT, a gas releasing valve BV, and a mounting member FE. The filler neck 100 is fixed to a fueling chamber FR of a vehicle by the mounting member FE, and receives the insertion of the fueling nozzle FN to the filler port 104. Using a disk-shaped base plate having a circular hole, into which a part of the filler neck 100 is inserted at a center, instead of the mounting member FE illustrated in the drawing, the filler neck 100 may be mounted to the fueling chamber FR.

The filler neck 100 is connected to the fuel tank FT through the filler pipe FP and the fuel vapor tube NT. Then, the filler neck 100 guides a liquid fuel such as gasoline from the fueling nozzle FN (see FIG. 1) inserted into the filler port 104 to the fuel tank FT connected through the filler pipe FP. The filler pipe FP is, for example, a resin tube having a bellows structure at two places, and is extensible and bendable at a certain range. The filler pipe FP is connected to the fuel tank FT through the check valve TV. The fuel discharged from the fueling nozzle FN inserted into the filler port 104 is guided to the fuel tank FT from the check valve TV through a fuel passage (to be described below), which is formed by the filler neck 100, and the filler pipe FP. The check valve TV prevents backflow of the fuel from the fuel tank FT to the filler pipe FP.

One end of the fuel vapor tube NT is connected to the fuel tank FT through the gas releasing valve BV, and the other end thereof is connected to the fuel vapor port 102 protruding from the filler neck 100. The gas releasing valve BV functions as a joint for connecting the fuel vapor tube NT to the fuel tank FT. In-tank air containing fuel vapor flows into the fuel vapor tube NT from the gas releasing valve BV. The fuel vapor is guided to the fuel tank FT through the filler pipe FP together with the supplied fuel at the time of fueling from the fueling nozzle FN. The filler neck 100 will be described below in detail.

(2) Configuration and Operation of Respective Portions of Filler Neck

Figure 2:
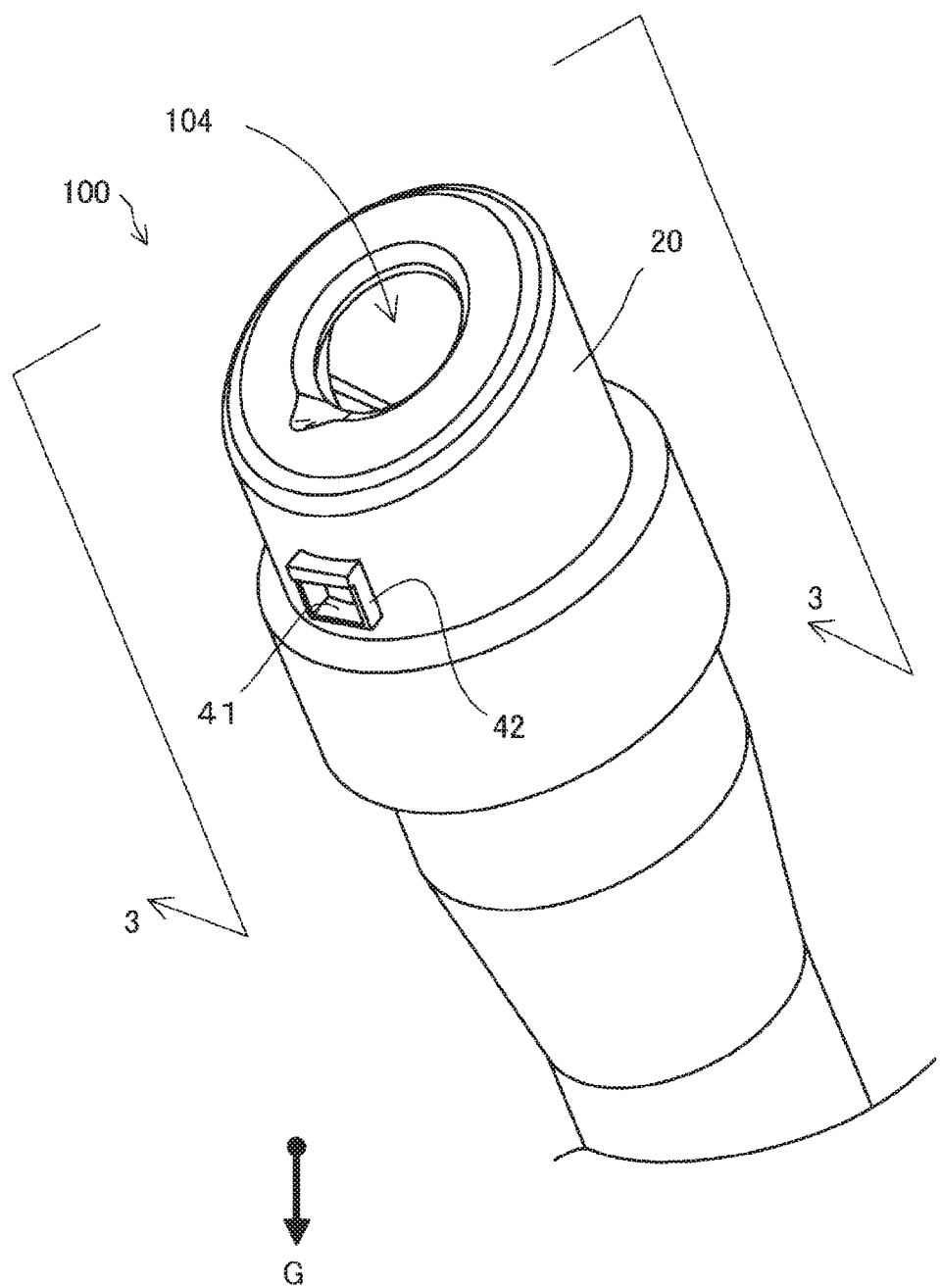
FIG. 2 is a perspective view schematically illustrating a filler neck functioning as an opening/closing apparatus for a fuel tank of a first embodiment.
Figure 3:
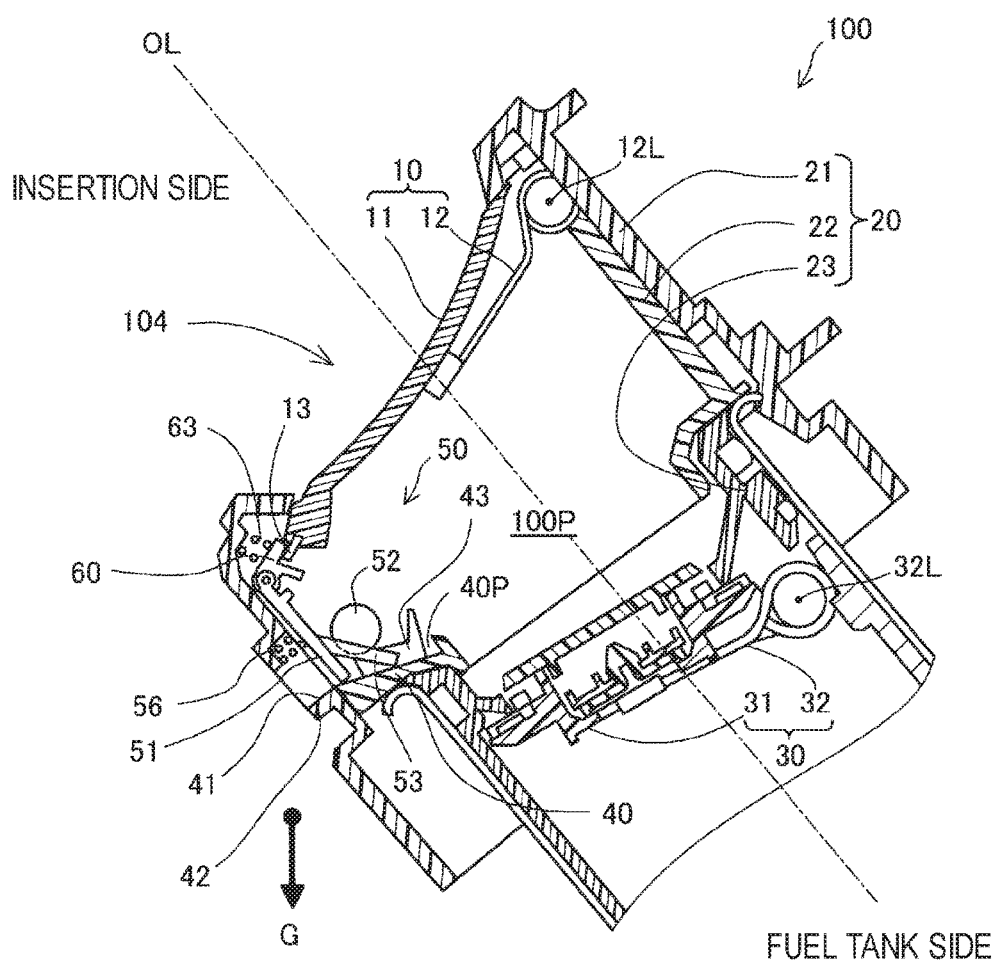
FIG. 3 is a sectional view taken along line 3-3 in FIG. 2 for explaining main portions of the filler neck.
Figure 4:
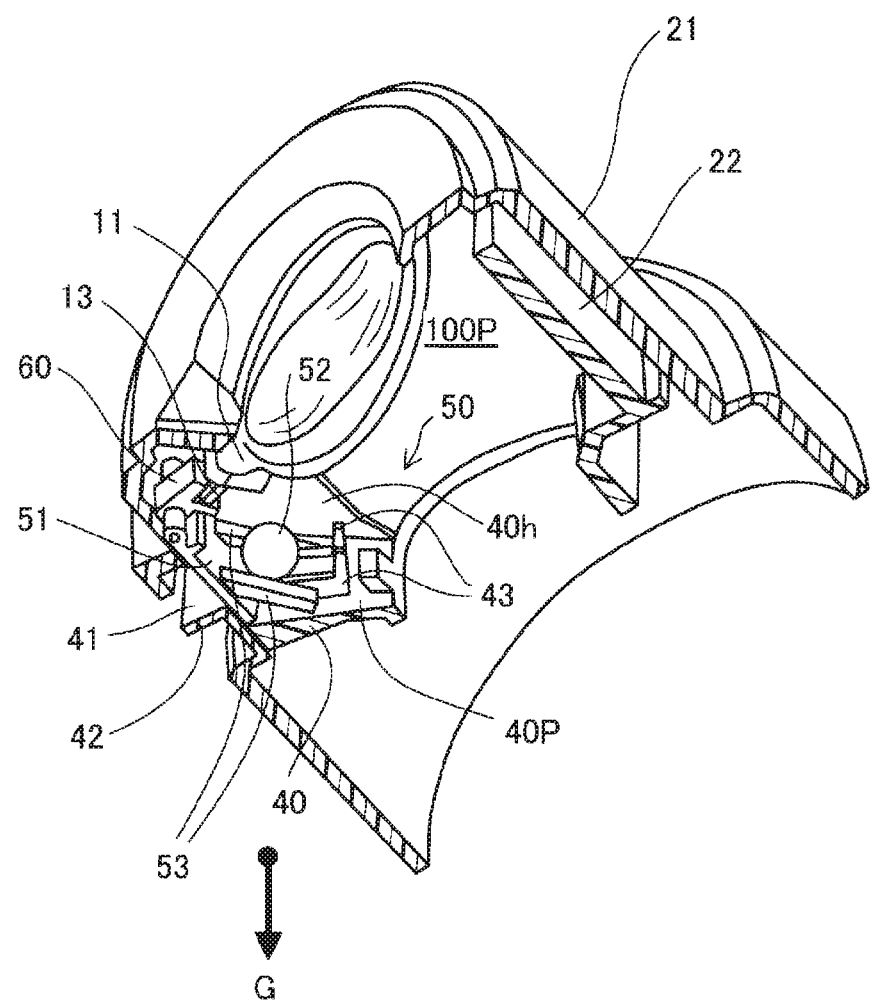
FIG. 4 is an explanatory perspective view illustrating main portions of the filler neck when viewed from the cross section.

FIG. 2 is a perspective view schematically illustrating the filler neck 100 functioning as the opening/closing apparatus for the fuel tank of the first embodiment. FIG. 3 is a sectional view taken along line 3-3 in FIG. 2 for explaining main portions of the filler neck 100. FIG. 4 is an explanatory perspective view illustrating main portions of the filler neck 100 when viewed from the cross section. In the following description, a side closer to the fuel tank rather than the filler port 104 is referred to as "fuel tank side" as appropriate, and a side closer to the filler port 104 rather than the fuel tank is referred to as "insertion side" as appropriate. In order to clearly illustrate constituent members in FIG. 3, each of the constituent members is illustrated as end face in a cross section.

As illustrated in FIG. 3, the filler neck 100 includes a fuel passage forming portion 20 configured to form a fuel passage 100P, an insertion-side opening/closing valve mechanism 10, a fuel tank-side opening/closing valve mechanism 30, a liquid discharge path forming portion 40, an opening/closing valve mechanism 50, and valve body regulating mechanism 60. The fuel passage forming portion 20 has a cylindrical shape and includes an outer body 21 configured to form the filler port 104, an inner body 22 surrounding the fuel passage 100P at the insertion side, and an under body 23 incorporated with the fuel tank-side opening/closing valve mechanism 30 at the fuel tank side. The fuel passage 100P is surrounded by each of the bodies described above, and guides a liquid fuel supplied from the filler port 104 to the fuel tank side along an axis OL.

The insertion-side opening/closing valve mechanism 10 is disposed in the outer body 21, which is made of PE (polyethylene), of the fuel passage forming portion 20, and opens and closes the filler port 104 of the fuel passage 100P. That is, the insertion-side opening/closing valve mechanism 10 opens the filler port 104 as the fueling nozzle FN is inserted into the filler port 104, and closes the filler port 104 in a state where the fueling nozzle is not inserted. The insertion-side opening/closing valve mechanism 10 includes an insertion-side opening/closing member 11 which opens and closes the filler port 104 and an insertion-side spring 12 which is fixed to the fuel passage forming portion 20 to urge the insertion-side opening/closing member 11 in a closing direction. The insertion-side opening/closing member 11 is formed in a disk shape in which a central part is recessed toward the fuel tank side. The insertion-side spring 12 is fixed to the fuel passage forming portion 20 at a fixing end 12L, and is fixed to the insertion-side opening/closing member 11 at a free end opposite to the fixing end 12L. The insertion-side spring 12 pivots about the fixing end 12L in a range of a predetermined angle and urges the insertion-side opening/closing member 11 in a direction in which the fuel passage 100P is closed. The insertion-side spring 12 is disposed such that the fixing end 12L is located above the free end in a direction of gravity in the state where the insertion-side opening/closing valve mechanism 10 is closed when the filler neck 100 is mounted on the vehicle. In other words, the insertion-side spring 12 is disposed above the axis OL in the direction of gravity. In the course of insertion of the fueling nozzle, when the fueling nozzle comes in contact with insertion-side opening/closing member 11 and a stronger force than the urging force of the insertion-side spring 12 is applied to the fuel tank side, the insertion-side opening/closing member 11 rotates about the fixing end 12L toward the fuel tank side, whereby the insertion-side opening/closing valve mechanism 10 is opened.

The fuel tank-side opening/closing valve mechanism 30 is disposed on the under body 23 of the fuel passage forming portion 20 on the fuel tank side rather than the insertion-side opening/closing valve mechanism 10 and opens and closes the fuel passage 100P. The fuel tank-side opening/closing valve mechanism 30 includes a fuel tank-side opening/closing member 31 configured to open and close the fuel passage 100P and a fuel tank-side spring 32 fixed to the fuel passage forming portion 20 and configured to urge the fuel tank-side opening/closing member 31 in the closing direction. The fuel tank-side opening/closing member 31 is a flap valve configured to prevent the backflow of the liquid fuel from the fuel tank side toward the insertion side. The fuel tank-side spring 32 is fixed to the fuel passage forming portion 20 at a fixing end 32L, and is fixed to the fuel tank-side opening/closing member 31 at a free end opposite to the fixing end 12L. The fuel tank-side spring 32 pivots about the fixing end 32L in a range of a predetermined angle to urge the fuel tank-side opening/closing member 31 in the closing direction of the fuel passage 100P. The fuel tank-side spring 32 is disposed such that the fixing end 12L is located above the free end in the direction of gravity in the state where the fuel tank-side opening/closing valve mechanism 30 is closed when the filler neck 100 is mounted on the vehicle. In other words, the fuel tank-side spring 32 is disposed above the axis OL in the direction of gravity, similarly to the insertion-side spring 12 of the insertion-side opening/closing valve mechanism 10.

The opening/closing valve mechanism 50 opens and closes the liquid discharge port 41 of the liquid discharge path 40P by a valve body 51 disposed inside the fuel passage forming portion 20, specifically, on an inner wall of the inner body 22. The inner body 22 is made of POM (polyacetal). The liquid discharge path 40P is formed by the liquid discharge path forming portion 40 occupying a part of the inner body 22, and allows an internal region of the fuel passage forming portion 20, specifically, an internal region between the outer body 21 and the inner body 22 to communicate with the outside of the filler neck 100 through the liquid discharge port 41. In other words, the liquid discharge path 40P is a flow path branched from the fuel passage 100P which is closer to the fuel tank side than the insertion-side opening/closing valve mechanism 10 and is located on the insertion side of the fuel tank-side opening/closing valve mechanism 30. The liquid discharge port 41 is formed in the outer body 21 of the fuel passage forming portion 20 between the insertion-side opening/closing valve mechanism 10 and the fuel tank-side opening/closing valve mechanism 30, and is surrounded by a partition wall 42 at the outer wall of the body. The inner body 22 may be disposed between the valve body 51 of the opening/closing valve mechanism 50 and the outer body 21. In this case, an opening overlapping the liquid discharge port 41 of the outer body 21 may be provided in the inner body 22, thereby forming the liquid discharge path 40P.

The liquid discharge path forming portion 40 includes a pair of liquid discharge path-side rails 43, which perform movement guide and stop position regulation of a metal spherical weight body 52 (which will be described below) included in the opening/closing valve mechanism 50, in the liquid discharge path 40P reaching the liquid discharge port 41. The metal spherical weight body 52 may be a tin spherical weight body having a large mass. The liquid discharge path-side rails 43 will be described below together with the configuration of the opening/closing valve mechanism 50. The liquid discharge path forming portion 40 is disposed below the fuel passage forming portion 20 in the direction of gravity when the filler neck 100 is mounted on the vehicle. In other words, according to the embodiment, the liquid discharge path forming portion 40 and the liquid discharge path 40P are disposed on the lower side of the axis OL when the filler neck 100 is slantingly fixed to the vehicle as illustrated in FIG. 3, and the liquid discharge port 41 is located at a vertically lower side than the fuel passage 100P. In addition, the liquid discharge path forming portion 40 and the liquid discharge path 40P are disposed on a side opposite to the fixing end 12L of the insertion-side spring 12 and the fixing end 32L of the fuel tank-side spring 32 with the axis OL as a center.

Figure 5:
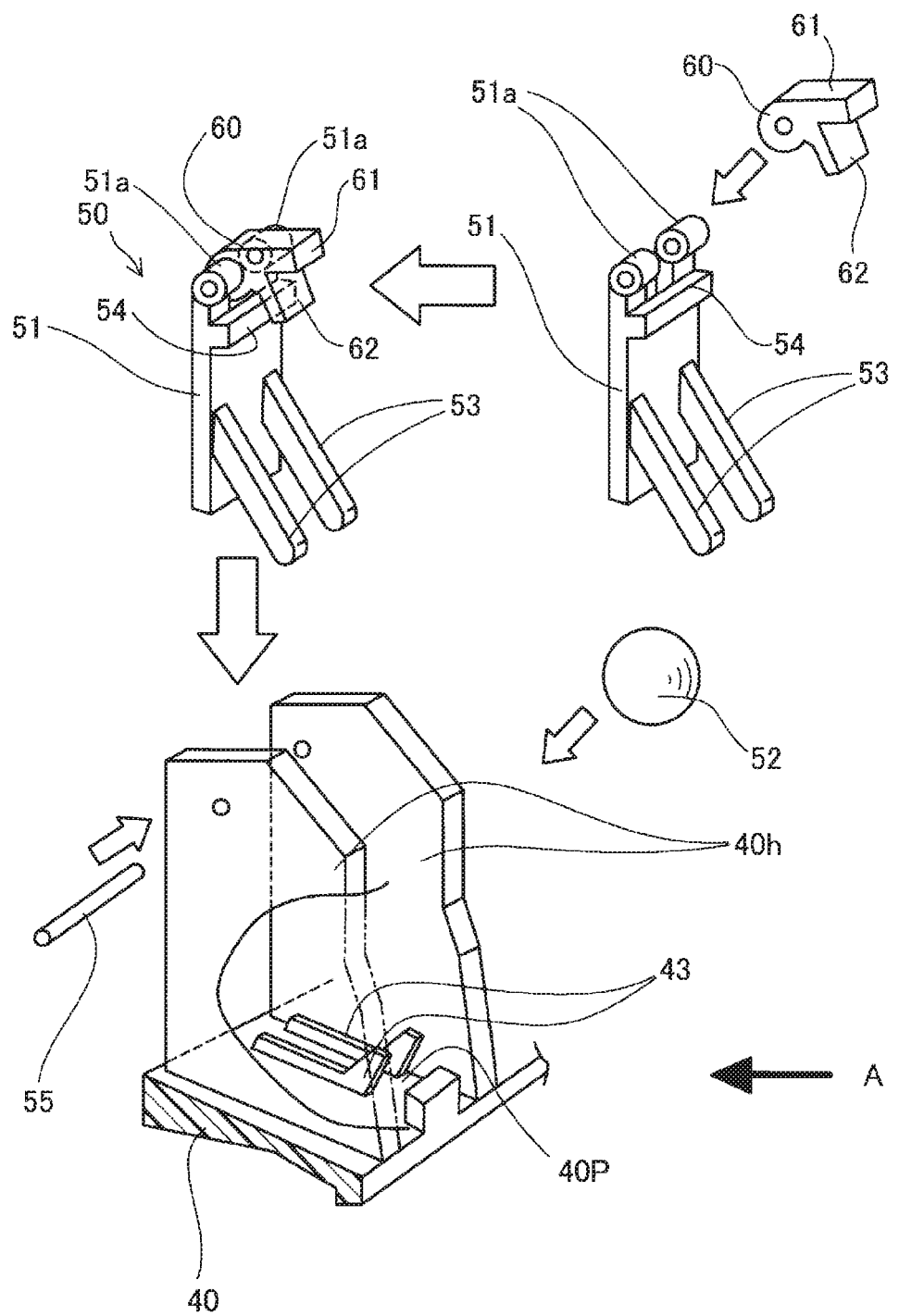
FIG. 5 is an explanatory view illustrating constituent members of an opening/closing valve mechanism and an assembling state thereof together with a valve body regulating mechanism.
Figure 6:
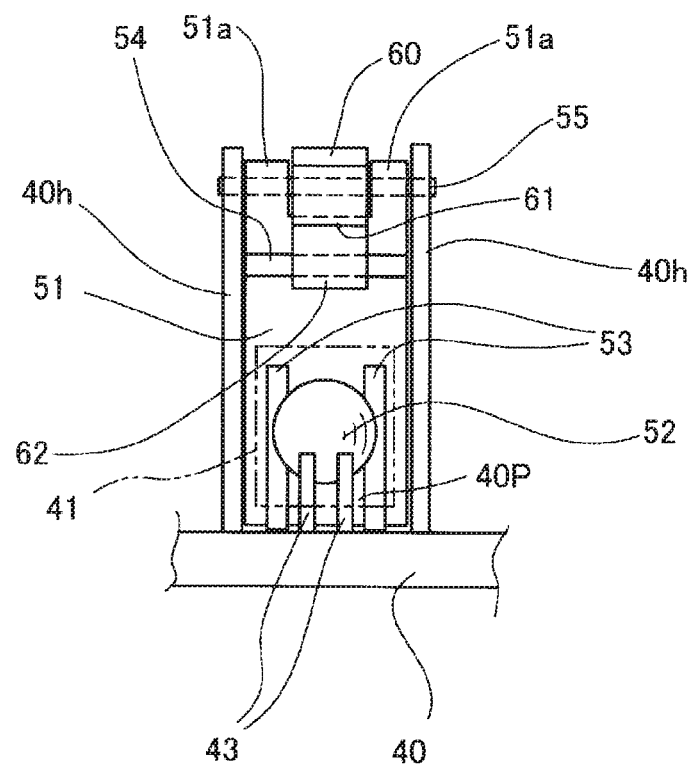
FIG. 6 is an explanatory front view illustrating the opening/closing valve mechanism as viewed in a direction "A" in FIG. 5.

The opening/closing valve mechanism 50 includes valve body-side rails 53 protruding from the valve body 51 to the liquid discharge path 40P, and a spring 56 in addition to the valve body 51 which opens and closes the liquid discharge port 41 in the liquid discharge path 40P. The valve body regulating mechanism 60 includes a first engaging portion 61 and a second engaging portion 62 so as to regulate the movement of the valve body 51. FIG. 5 is an explanatory view illustrating constituent members of the opening/closing valve mechanism 50 and an assembling state thereof together with the valve body regulating mechanism 60. FIG. 6 is an explanatory front view illustrating the opening/closing valve mechanism 50 as viewed in a direction "A" in FIG. 5.

As illustrated in FIG. 5, the liquid discharge path forming portion 40 partitions both sides of the liquid discharge path 40P with the shielding wall 40h protruding from an upper surface of the liquid discharge path forming portion, and has the pair of liquid discharge path-side rails 43 between the shielding walls 40h. Then, the opening/closing valve mechanism 50 is assembled with the valve body 51 inserted between the shielding walls 40h in a state where the valve body regulating mechanism 60 is incorporated in the pivot support arm 51a of the valve body 51. In this assembled opening/closing valve mechanism 50, as illustrated in FIG. 6, the valve body-side rails 53 are positioned on the outer side of the liquid discharge path-side rails 43 and protrudes obliquely toward the liquid discharge path 40P from the valve body 51. Moreover, the valve body 51 is pivotably supported on the shielding wall 40h by a pivot support pin 55, and the valve body regulating mechanism 60 is pivotably supported on the pivot support pin 55 in a state of being incorporated in the pivot support arm 51a of the valve body 51. Therefore, the valve body 51 of the opening/closing valve mechanism 50 and the valve body regulating mechanism 60 are respectively pivotable around the pivot support pin 55. That is, the opening/closing valve mechanism 50 opens and closes the liquid discharge port 41 by the pivotable movement of the valve body 51 around the pivot support pin 55. By the pivotable movement around the pivot support pin 55, the second engaging portion 62 of the valve body regulating mechanism 60 is engaged with an engaging protrusion 54 of the valve body 51 and the first engaging portion 61 of the valve body regulating mechanism 60 is engaged with the insertion-side opening/closing member 11 (see FIG. 4) of the insertion-side opening/closing valve mechanism 10. The spherical weight body 52 is disposed on the valve body-side rails 53. When the valve body 51 and the valve body regulating mechanism 60 are incorporated, the spring 56 illustrated in FIG. 3 is incorporated in the partition wall 42 and urges the valve body 51 of the opening/closing valve mechanism 50 to be opened. Similarly, the spring 63 illustrated in FIG. 3 is incorporated in the outer body 21 of the fuel passage forming portion 20 to urge the first engaging portion 61 of the valve body regulating mechanism 60 toward the engaging piece 13 (see FIG. 4) of the insertion-side opening/closing member 11. The distance between the two valve body-side rails 53 and the distance between the two liquid discharge path-side rails 43 are narrower than the diameter of the spherical weight body 52.

(3) Operational Effects of Opening/Closing Valve Mechanism 50

Figure 7:
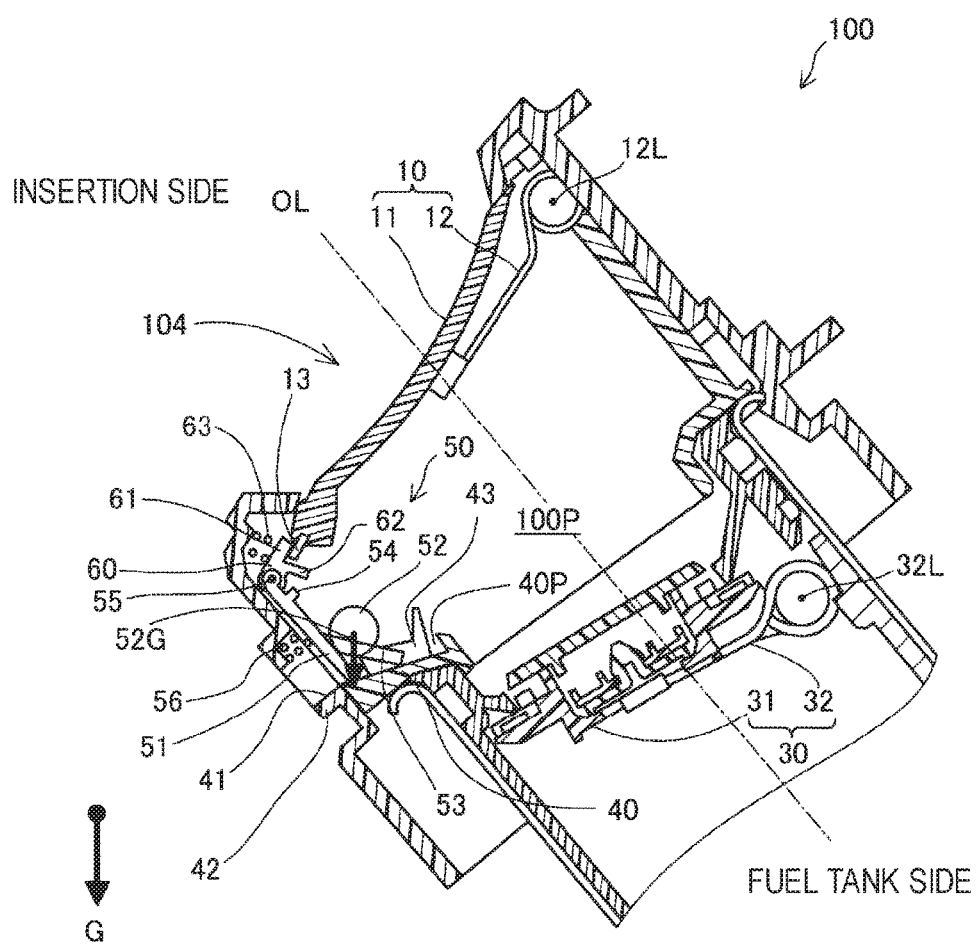
FIG. 7 is an explanatory view illustrating how a liquid discharge port s closed by the opening/closing valve mechanism and how a valve body is regulated by the body regulating mechanism when a vehicle is in a stopped state.
Figure 8:
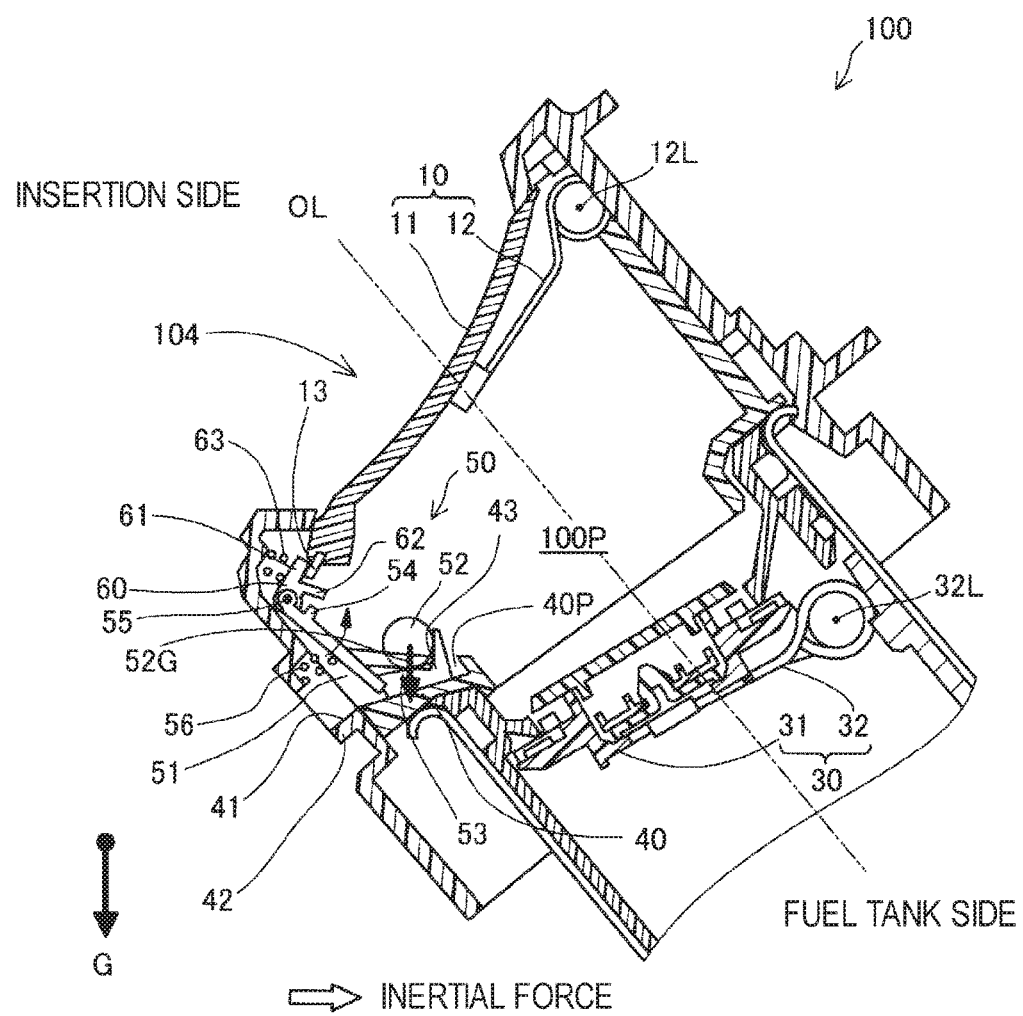
FIG. 8 is an explanatory view illustrating how the liquid discharge port is opened by the opening/closing valve mechanism and how the valve body is regulated by the valve body regulating mechanism when the vehicle is traveling from the stopped state.

FIG. 7 is an explanatory view illustrating how the liquid discharge port is closed by the opening/closing valve mechanism 50 and how the valve body is regulated by the body regulating mechanism 60 when the vehicle is in a stopped state. FIG. 8 is an explanatory view illustrating how the liquid discharge port 41 is opened by the opening/closing valve mechanism 50 and how the valve body 51 is regulated by the valve body regulating mechanism 60 when the vehicle is traveling from the stopped state.

In the stopped state of the vehicle, as illustrated in FIG. 7, the spherical weight body 52 is in contact with the valve body 51 and stops at an intersection point between the valve body-side rails 53 and the liquid discharge path-side rails 43. Then, the spherical weight body 52 is positioned at this intersection point and makes its own weight 52G act on the valve body 51 and the valve body-side rails 53. The own weight 52G of the spherical weight body 52 acting on the valve body 51 and the valve body-side rails 53 exerts on the valve body 51 integrated with the valve body-side rails 53 to close the liquid discharge port 41. That is, the spherical weight body 52 functions as a moving body and a spherical moving body exerting a closing force on the valve body 51 to close the liquid discharge port 41, and the intersection point between the valve body-side rails 53 and the liquid discharge path-side rails 43 is a first position where the closing force exerts on the valve body 51 to close liquid discharge port 41. In the stopped state of the vehicle in which the valve body 51 is located at the first position of the intersection point, the valve body 51 of the opening/closing valve mechanism 50 receives the closing force from the spherical weight body 52, thereby closing the liquid discharge port 41.

Since the vehicle is in the stopped state, the filler port 104 is close by the insertion-side opening/closing member 11 of the insertion-side opening/closing valve mechanism 10, and the engaging piece 13 of the insertion-side opening/closing member 11 is engaged with the first engaging portion 61 of the valve body regulating mechanism 60. Accordingly, since the valve body regulating mechanism 60 does not pivot around the axis of the pivot support pin 55, the engagement between the second engaging portion 62 and the engaging protrusion 54 of the valve body 51 is released, and the valve body 51 is in a state of being pivotable around the axis of the pivot support pin 55. In this state, when the vehicle is travelling from the stopped state, the spherical weight body 52 receives an inertial force due to the traveling of the vehicle and stably rolls from the valve body-side rails 53 toward the liquid discharge path-side rails 43, as illustrated in FIG. 8, and is supported and stopped by the liquid discharge path-side rails 43. In other words, the spherical weight body 52 moves to the stop position defined by the liquid discharge path-side rails 43, such that the closing force exerting on the valve body 51 up to the stop position is reduced or the closing force does not exert on the valve body 51. From this, the stop position where the spherical weight body 52 is supported and stopped by the liquid discharge path-side rails 43 is a second position where the closing force decreases, and the spherical weight body 52 is movable from the first position that is the intersection point to the second position that is the stop position. Then, the valve body-side rails 53 of the opening/closing valve mechanism 50 cooperate with the liquid discharge path-side rails 43, and function as a moving rail of the spherical weight body 52, which extend from the first position to the second position. Since the valve body 51 receives the urging force of the spring 56 in a state where the closing force from the spherical weight body 52 is reduced or in a state where the closing force does not exert, the valve body 51 pivots around the axis of the pivot support pin 55 due to the urging force, whereby the liquid discharge port 41 is opened.

Figure 9:
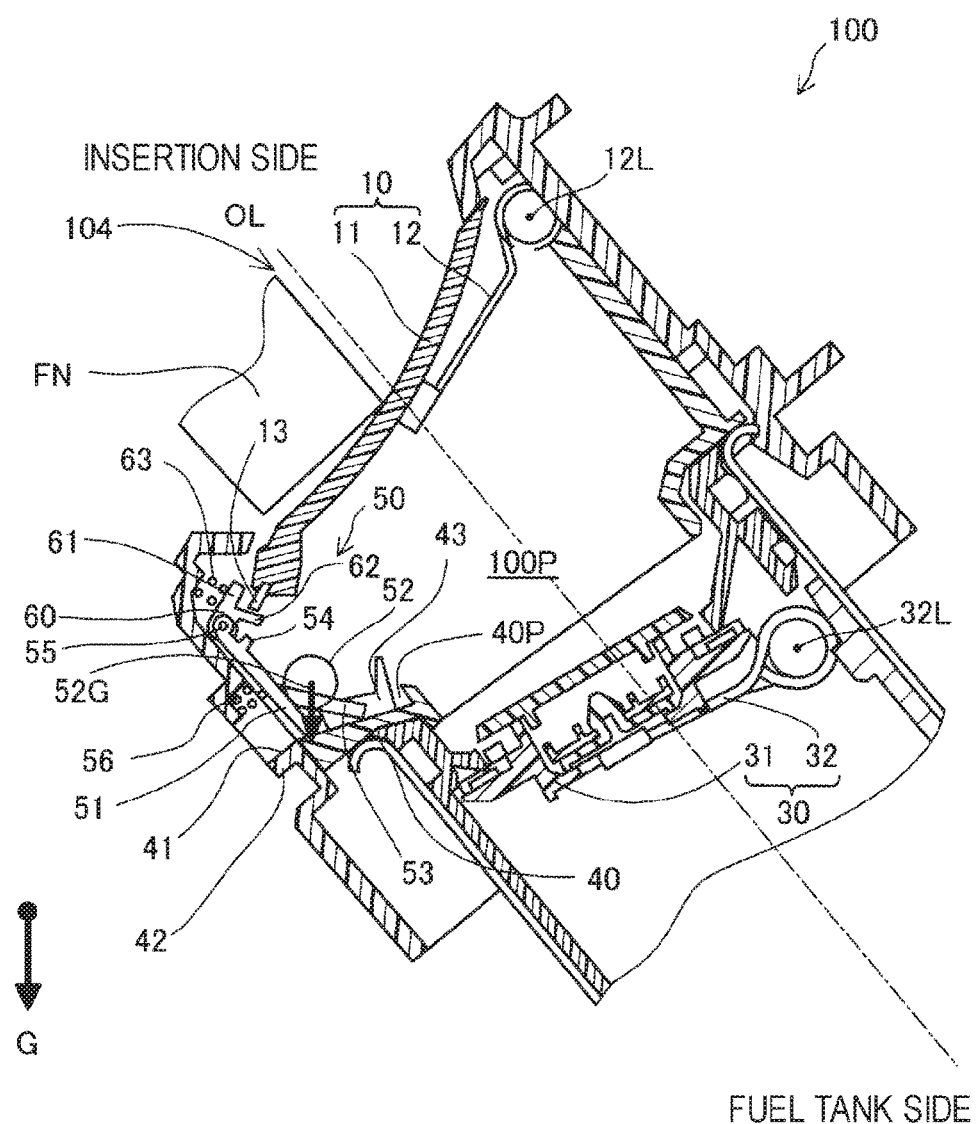
FIG. 9 is an explanatory view illustrating how the liquid discharge port is closed by the opening/closing valve mechanism and how the valve body is regulated by the valve body regulating mechanism before fueling.
Figure 10:
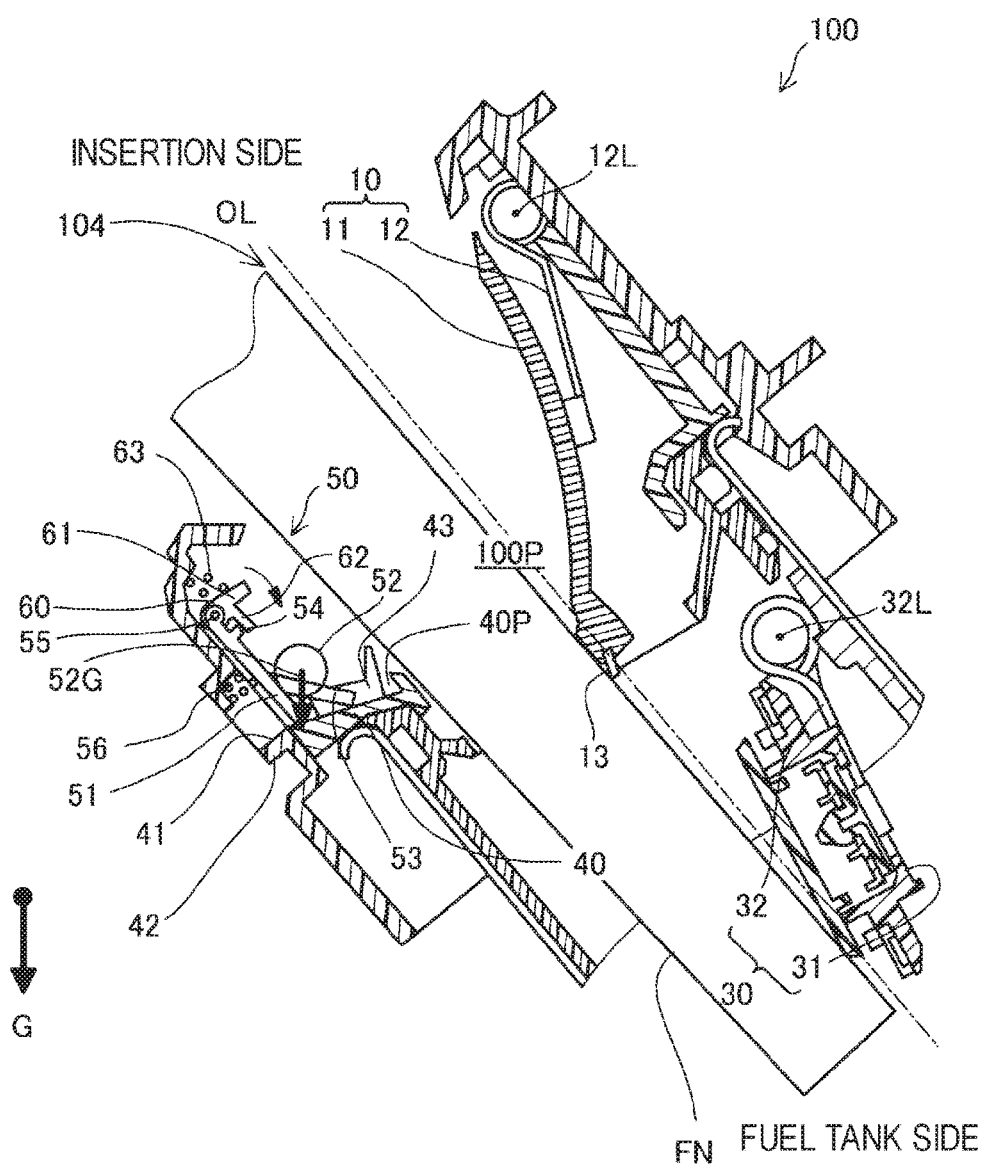
FIG. 10 is an explanatory view illustrating how the valve body is regulated by the valve body regulating mechanism during fueling.

FIG. 9 is an explanatory view illustrating how the liquid discharge port is closed by the opening/closing valve mechanism 50 and how the valve body is regulated by the valve body regulating mechanism 60 before fueling. FIG. 10 is an explanatory view illustrating how the valve body 51 is regulated by the valve body regulating mechanism 60 during fueling.

Before the fueling, since the vehicle is in a stopped state, the opening/closing valve mechanism 50 brings the spherical weight body 52 into contact with the valve body 51, and then positions the spherical weight body 52 at the first position that is the intersection point between the valve body-side rails 53 and the liquid discharge path-side rails 43, thereby exerting the closing force on the valve body 51 to close the liquid discharge port 41. Then, as illustrated in FIG. 9, since the fueling nozzle FN is inserted from the filler port 104 as the fueling is performed, the insertion-side opening/closing member 11 of the insertion-side opening/closing valve mechanism 10 is driven to open the filler port 104 by the fueling nozzle FN, and the engagement between the engaging piece 13 of the insertion-side opening/closing member 11 and the first engaging portion 61 of the valve body regulating mechanism 60 is released. When the fueling nozzle FN is further inserted, as illustrated in FIG. 10, the insertion-side opening/closing member 11 of the insertion-side opening/closing valve mechanism 10 is further driven to open the filler port 104, and then the fuel tank-side opening/closing member 31 of the fuel tank-side opening/closing valve mechanism 30 is also driven to the opening side. Thus, when the insertion-side opening/closing member 11 opens the filler port 104, the engagement between the engaging piece 13 of the insertion-side opening/closing member 11 and the first engaging portion 61 of the valve body regulating mechanism 60 is released. Accordingly, the valve body regulating mechanism 60 receives the urging force of the spring 63, thereby pivoting around the axis of the pivot support pin 55, and thus, as illustrated in FIG. 10, the second engaging portion 62 is engaged with the engaging protrusion 54 of the valve body 51. By this engagement, the movement of the valve body 51 around the axis of the pivot support pin 55 is regulated and the closed state of the liquid discharge port 41 is maintained. That is, the valve body 51 is regulated to close the liquid discharge port 41 by the engagement between the second engaging portion 62 and the engaging protrusion 54.

In the filler neck 100 functioning as the opening/closing apparatus for the fuel tank according to the embodiment as described above, the opening/closing valve mechanism 50 positions the spherical weight body 52 at the first position in the stopped state of the vehicle during fuel supply to exert the closing force on the valve body 51 to close the liquid discharge port 41, whereby the liquid discharge port 41 is closed by the valve body 51. Therefore, according to the filler neck 100 of the present embodiment, the liquid discharge port 41 is closed by the valve body 51 during the fuel supply, and thus it is possible to suppress introduction of outside air from the liquid discharge path 40P into not only the internal region of the fuel passage forming portion 20 but also the fuel passage 100P. Additionally, in the filler neck 100 of the present embodiment, when the vehicle is travelling from the stopped state, as illustrated in FIG. 8, the spherical weight body 52 of the opening/closing valve mechanism 50 receives the inertial force due to the traveling of the vehicle and moves from the first position to the second position that is the stop position defined by the liquid discharge path-side rails 43, such that the closing force exerting on the valve body 51 is reduced or the closing force does not exert on the valve body 51. Therefore, since the valve body 51 of the opening/closing valve mechanism 50 opens the liquid discharge port 41 in the traveling state of the vehicle, if water is stored in the internal region of the fuel passage forming portion 20, the water can be discharged from the liquid discharge path 40P to the outside of the filler neck 100 in the traveling state of the vehicle.

In the filler neck 100 of the present embodiment, since the spherical weight body 52 constituting the opening/closing valve mechanism 50 is guided by the valve body-side rails 53 and the liquid discharge path-side rails 43, the effectiveness of the movement of the spherical weight body 52 from the first position to the second position is increased as described above. Accordingly, with the movement of the spherical weight body 52 from the first position to the second position when the vehicle is travelling from the stopped state, the valve body 51 reliably opens the liquid discharge port 41. As a result, according to the filler neck 100 of the present embodiment, it is possible to more reliably discharge the water stored in the internal region of the fuel passage forming portion 20 from the liquid discharge path 40P to the outside of the filler neck 100 in the traveling state of the vehicle.

In the filler neck 100 of the present embodiment, during the fuel supply that the insertion-side opening/closing member 11 of the insertion-side opening/closing valve mechanism 10 opens the filter port 104 with the fueling nozzle FN, as illustrated in FIG. 10, the engagement between the first engaging portion 61 of the valve body regulating mechanism 60 and the engaging piece 13 of the insertion-side opening/closing member 11 is released to engage the second engaging portion 62 of the valve body regulating mechanism 60 with the engaging protrusion 54 of the valve body 51, and the movement of the valve body 51 is regulated to close the liquid discharge port 41. Accordingly, the closing state of the liquid discharge port 41 due to the valve body 51 through the spherical weight body 52 moved to the first position is maintained by the engagement between the second engaging portion 62 of the valve body regulating mechanism 60 and the valve body 51. As a result, according to the filler neck 100 of the present embodiment, it is possible to effectively suppress the introduction of outside air from the liquid discharge path 40P into the fuel passage 100P during the fuel supply. Additionally, according to the filler neck 100 of the present embodiment, when the vehicle is in a traveling state in which the insertion-side opening/closing member 11 closes the filler port 104, as illustrated in FIG. 7, the first engaging portion 61 of the valve body regulating mechanism 60 and the engaging piece 13 of the insertion-side opening/closing member 11 are engaged with each other, and the second engaging portion 62 and the valve body 51 are disengaged from each other. According to the filler neck 100 of the present embodiment, due to the reduction of the closing force exerting on the valve body 51 accompanying the movement of the spherical weight body 52 in the traveling state of the vehicle, the discharge of the stored water from the liquid discharge path 40P to the outside is effectively improved after the liquid discharge port 41 is opened by the valve body 51.

B. Second Embodiment

Figure 11:
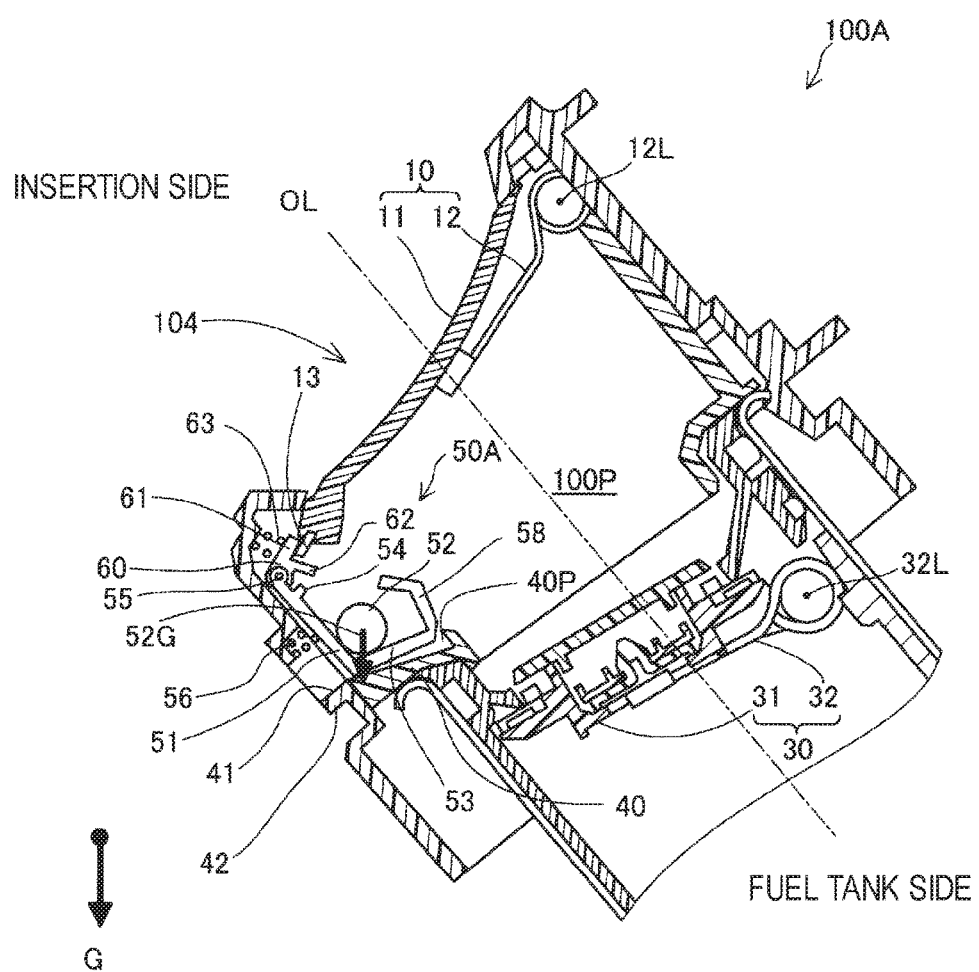
FIG. 11 is an explanatory view illustrating a filler neck according to a second embodiment viewed from the cross section.
Figure 12:
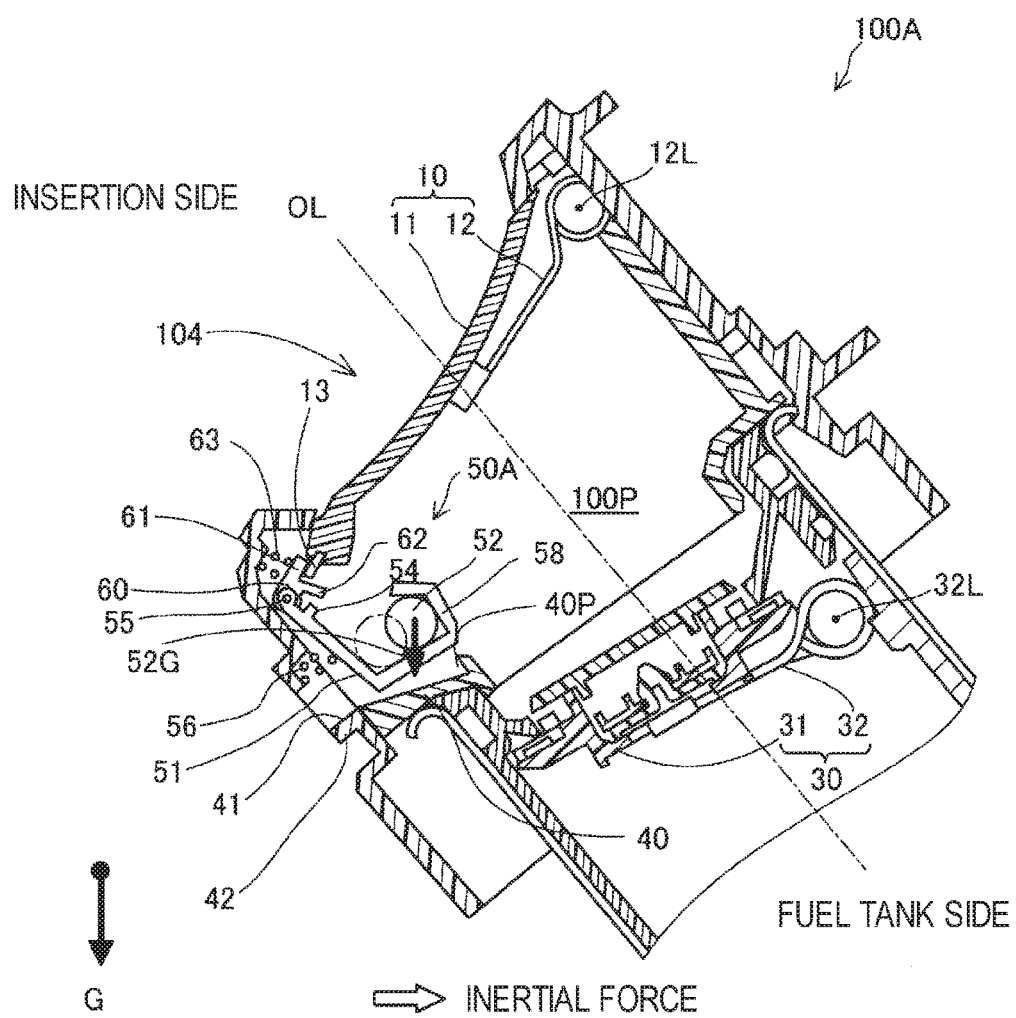
FIG. 12 is a sectional view for explaining an open state of a liquid discharge port, a regulation state of a valve body, and the filler neck when a vehicle is travelling from a stopped state.

FIG. 11 is an explanatory view illustrating a filler neck 100A according to a second embodiment when viewed from the cross section. FIG. 12 is a sectional view for explaining an open state of a liquid discharge port 41, a regulation state of a valve body 51, and the filler neck 100A when the vehicle is travelling from a stopped state. The filler neck 100A of the second embodiment differs from the filler neck 100 of the first embodiment in terms of a configuration of the valve body 51. In the filler neck 100A, the valve body 51 includes a weight fence 58 in place of the valve body-side rails 53. The weight fence 58 accommodates a spherical weight body 52 such that the spherical weight body 52 is movable between a first position that is a contact position where the spherical weight body 52 is in contact with the valve body 51, and a second position that is an end position where the spherical weight body 52 is away from the valve body 51. As illustrated in FIG. 11, since the filler neck 100A is inclined with respect to a vertical direction, the spherical weight body 52 is normally positioned at the first position that is the contact position where the spherical weight body 52 is in contact with the valve body 51 by its own weight 52G, and exerts the its own weight 52G acting as the closing force described above on the valve body 51 as in the first embodiment. Thus, even in the filler neck 100A of the second embodiment, when the vehicle is in the stopped state, the valve body 51 of the opening/closing valve mechanism 50 receives the closing force from the spherical weight body 52 to close the liquid discharge port 41, and suppresses the introduction of the outside air. In addition, when the vehicle is travelling from the stopped state, the spherical weight body 52 receives the inertial force due to the traveling of the vehicle to perform rolling movement and to apply a force to the valve body 51 to open the liquid discharge port 41, as illustrated in FIG. 12. That is, the spherical weight body 52 reduces the closing force that has been exerted on the valve body 51 by the rolling movement illustrated in a lower part in FIG. 9. Therefore, even in the filler neck 100A of the second embodiment, when the vehicle is travelling from the stopped state, the liquid discharge port 41 is opened. Consequently, it is possible to achieve the effect described above even in the filler neck 100A of the second embodiment.

The invention is not limited to any of the embodiments and the modifications described above but may be implemented by as diversity of other configurations without departing from the scope of the invention. For example, the technical features of any of the embodiments and modifications corresponding to the technical features of the respective aspects described in summary may be replaced or combined appropriately, in order to solve part or all of the problems described above or in order to achieve part or all of the advantageous effects described above. Components other than those described in independent claims among components of any of the above embodiments and modifications are additional components and may be omitted appropriately.

In the second embodiment described above, since the valve body 51 is driven to open the liquid discharge port 41 by the movement of the spherical weight body 52 which receives the inertial force due to the traveling of the vehicle, the spring 56 may not be provided.

In the above-described embodiment, the valve body regulating mechanism 60 is used in combination with the opening/closing valve mechanism 50, but the valve body regulating mechanism 60 may not be provided.

According to an aspect of the invention, there is provided an opening/closing apparatus for a fuel tank of a vehicle, the opening/closing apparatus comprising: a fuel passage forming portion that forms a fuel passage configured to guide a supplied liquid fuel to the fuel tank; an insertion-side opening/closing valve mechanism that is disposed in the fuel passage forming portion, and that configured to open and close a filler port of the fuel passage; a fuel tank-side opening/closing valve mechanism that is disposed in a portion of the fuel passage forming portion, the portion closer to the fuel tank than the insertion-side opening/closing valve mechanism, the fuel tank-side opening/closing valve mechanism that is configured to open and close the fuel passage; a liquid discharge path that is configured to allow an internal region of the fuel passage forming portion to communicate with the outside of the opening/closing apparatus through a liquid discharge port formed in the fuel passage forming portion between the insertion-side opening/closing valve mechanism and the fuel tank-side opening/closing valve mechanism; and an opening/closing valve mechanism that is configured to open and close the liquid discharge port by a valve body disposed in the fuel passage forming portion, and that includes a moving body which is movable from a first position where a closing force exerts on the valve body to close the liquid discharge port to a second position where the closing force decreases, the moving body which is positioned at the first position in a state where the vehicle is stopped, and which is configured to move from the first position to the second position when receiving an inertial force due to traveling of the vehicle.

In the opening/closing apparatus for the fuel tank according to the above configuration, the opening/closing valve mechanism positions the moving body at the first position in the stopped state of the vehicle during fuel supply to exert the closing force on the valve body to close the liquid discharge port, whereby the liquid discharge port is closed by the valve body. Therefore, according to the opening/closing apparatus of this configuration, the liquid discharge port is closed by the valve body during the fuel supply, and thus it is possible to suppress introduction of outside air from the liquid discharge path into not only the internal region of the fuel passage forming portion but also the fuel passage. Additionally, in the opening/closing apparatus of this configuration, when the vehicle is travelling from the stopped state and the moving body receives the inertial force due to the traveling of the vehicle, the moving body of the opening/closing valve mechanism moves from the first position to the second position, such that the closing force exerting on the valve body is reduced. Therefore, since the valve body of the opening/closing valve mechanism opens the liquid discharge port in the traveling state of the vehicle, if water is stored in the internal region of the fuel passage forming portion, the stored water can be discharged from the liquid discharge path to the outside of the opening/closing apparatus in the traveling state of the vehicle.

The moving body may have a spherical shape, and the opening/closing valve mechanism may include a moving rail extending from the first position to the second position. With this configuration, the spherical moving body stably moves from the first position to the second position in response to the acceleration due to the transition of the vehicle to the traveling state, thereby releasing the closure of the liquid discharge port by the valve body.

The opening/closing valve mechanism may further include a liquid discharge path-side rail extending from the first position to the second position. Even in this configuration, the movement of the spherical moving body from the first position to the second position due to the transition of the vehicle to the traveling state is stabilized, and the closure of the liquid discharge port is released by the valve body.

The opening/closing valve mechanism may include a weight fence that is configured to accommodate the moving body so that the moving body is movable between the first position and the second position. Even in this configuration, the movement of the spherical moving body from the first position to the second position due to the transition of the vehicle to the traveling state is stabilized, and the closure of the liquid discharge port is released by the valve body.

The opening/closing apparatus may further comprise: a valve body regulating mechanism that is configured to regulate movement of the valve body. The valve body regulating mechanism may include: a first engaging portion that is configured to engage with an insertion-side opening/closing member which is included in the insertion-side opening/closing valve mechanism and which is configured to open and close the filler port; and a second engaging portion that is configured to engage with the valve body, and, in state where the insertion-side opening/closing member opens the filler port, the valve body regulating mechanism may be configured to release engagement between the first engaging portion and the insertion-side opening/closing member to cause the second engaging portion to engage with the valve body, and be configured to regulate the valve body to close the liquid discharge port. With this configuration, the closing state of the liquid discharge port caused by the valve body with the moving body positioned at the first position is maintained by the engagement between the second engaging portion of the valve body regulating mechanism and the valve body during the fuel supply in which the insertion-side opening/closing member opens the filter port. Accordingly, according to the opening/closing apparatus for the fuel tank of this configuration, it is possible to effectively suppress the introduction of outside air from the liquid discharge path into the fuel passage during the fuel supply. Additionally, according to the opening/closing apparatus for the fuel tank of this configuration, when the vehicle is in a traveling state in which the insertion-side opening/closing member closes the filler port, the first engaging portion is engaged with the insertion-side opening/closing member, and thus the second engaging portion and the valve body are disengaged from each other. According to the opening/closing apparatus for the fuel tank of this configuration, the moving body moves from the first position to the second position in the traveling state of the vehicle, and thus the discharge of the stored water from the liquid discharge path to the outside of the opening/closing apparatus is effectively improved after the liquid discharge port is opened by the valve body.

The present invention can be realized by various aspects other than the opening/closing apparatus for the fuel tank. For example, the invention can be realized in the form of a fueling apparatus having the opening/closing apparatus for the fuel tank, a vehicle with the opening/closing apparatus for the fuel tank mounted thereon, and a method of manufacturing the opening/closing apparatus for the fuel tank.

What is claimed is:

1. An opening/closing apparatus for a fuel tank of a vehicle, the opening/closing apparatus comprising:
    a fuel passage forming portion that forms a fuel passage configured to guide a supplied liquid fuel to the fuel tank;
    an insertion-side opening/closing valve mechanism that is disposed in the fuel passage forming portion, and that is configured to open and close a filler port of the fuel passage;
    a fuel tank-side opening/closing valve mechanism that is disposed in a portion of the fuel passage forming portion, the portion closer to the fuel tank than the insertion-side opening/closing valve mechanism, the fuel tank-side opening/closing valve mechanism that is configured to open and close the fuel passage;
    a liquid discharge path that is configured to allow an internal region of the fuel passage forming portion to communicate with the outside of the opening/closing apparatus through a liquid discharge port formed in the fuel passage forming portion between the insertion-side opening/closing valve mechanism and the fuel tank-side opening/closing valve mechanism; and
    an opening/closing valve mechanism that is configured to open and close the liquid discharge port by a valve body disposed in the fuel passage forming portion, and that includes a moving body which is movable from a first position where a closing force exerts on the valve body to close the liquid discharge port to a second position where the closing force decreases, the moving body which is positioned at the first position in a state where the vehicle is stopped, and which is configured to move from the first position to the second position when receiving an inertial force due to traveling of the vehicle.

2. The opening/closing apparatus according to claim 1, wherein the moving body has a spherical shape, and the opening/closing valve mechanism includes a moving rail extending from the first position to the second position.

3. The opening/closing apparatus according to claim 2, wherein
the opening/closing valve mechanism further includes a liquid discharge path-side rail extending from the first position to the second position.

4. The opening/closing apparatus according to claim 1, wherein
the opening/closing valve mechanism includes a weight fence that is configured to accommodate the moving body so that the moving body is movable from the first position to the second position.

5. The opening/closing apparatus according to claim 3, further comprising:
a valve body regulating mechanism that is configured to regulate movement of the valve body, wherein
the valve body regulating mechanism includes: a first engaging portion that is configured to engage with an insertion-side opening/closing member which is included in the insertion-side opening/closing valve mechanism and which is configured to open and close the filler port; and a second engaging portion that is configured to engage with the valve body, and,
in a state where the insertion-side opening/closing member opens the filler port, the valve body regulating mechanism is configured to release engagement between the first engaging portion and the insertion-side opening/closing member to cause the second engaging portion to engage with the valve body, and is configured to regulate the valve body to close the liquid discharge port.

6. The opening/closing apparatus according to claim 1, further comprising:
a valve body regulating mechanism that is configured to regulate movement of the valve body, wherein
the valve body regulating mechanism includes: a first engaging portion that is configured to engage with an insertion-side opening/closing member which is included in the insertion-side opening/closing valve mechanism and which is configured to open and close the filler port; and a second engaging portion that is configured to engage with the valve body, and
in a state where the insertion-side opening/closing member opens the filler port, the valve body regulating mechanism is configured to release engagement between the first engaging portion and the insertion-side opening/closing member to cause the second engaging portion to engage with the valve body, and is configured to regulate the valve body to close the liquid discharge port.

* * * * *